United States Patent
Ohtachi et al.

(10) Patent No.: US 6,324,134 B1
(45) Date of Patent: Nov. 27, 2001

(54) DISK RECORDING AND REPRODUCING APPARATUS

(75) Inventors: Yoshinobu Ohtachi; Hirotaka Namiki; Akira Shimada; Yutaka Segawa; Ikuo Muto, all of Narashino (JP)

(73) Assignee: Seiko Instruments Inc. (JP)

( * ) Notice: Subject to any disclaimer, the term of this patent is extended or adjusted under 35 U.S.C. 154(b) by 0 days.

(21) Appl. No.: 09/368,116

(22) Filed: Aug. 4, 1999

(30) Foreign Application Priority Data

Aug. 5, 1998 (JP) ................................................. 10-221459
Sep. 2, 1998 (JP) ................................................. 10-248634

(51) Int. Cl.$^7$ ....................................................... G11B 7/00
(52) U.S. Cl. ..................................... 369/44.32; 369/53.22
(58) Field of Search ........................... 369/44.32, 44.27, 369/44.28, 47.1, 47.36, 47.37, 47.38, 47.4, 47.43, 53.1, 53.19, 53.37, 44.14

(56) References Cited

U.S. PATENT DOCUMENTS

| | | | |
|---|---|---|---|
| 5,150,343 | * 9/1992 | Goto et al. | 369/44.22 |
| 5,155,714 | * 10/1992 | Inoue | 369/13 |
| 5,617,402 | * 4/1997 | Bec et al. | 369/44.14 X |

FOREIGN PATENT DOCUMENTS 0806767    11/1997  (EP).
0829873     3/1998  (EP).

OTHER PUBLICATIONS

Patent Abstracts of Japan, vol. 1997, No. 09, Sep. 30, 1997, publication No. 09120565 on May 6, 1997.
Patent Abstracts of Japan, vol. 1996, No. 06, Jun. 28, 1996, publication No. 08055355 on Feb. 27, 1996.
Patent Abstracts of Japan, vol. 1998, No. 11, Sep. 30, 1998, publication No. 10177763 on Jun. 30, 1998.
Patent Abstracts of Japan, vol. 1997, No. 09, Sep. 30, 1997, publication No. 09120566 on May 6, 1997.

* cited by examiner

Primary Examiner—Muhammad Edun
(74) Attorney, Agent, or Firm—Adams & Wilks (57) ABSTRACT

Conventional disk recording and reproducing apparatuses have addressed a shortcoming that they cannot correct squareness errors and misalignments caused by the warpage of a disk and the eccentricity of the center hole of the disk and of the center of curvature of signal tracks. To overcome this shortcoming, a disk recording and reproducing apparatus of the present invention comprises: magnetic bearing means capable of supporting a rotary body and adjusting a relative position of the rotary body; a pickup for irradiating, with a laser beam, a recording surface of a disk mounted on a table arranged on the rotary body and receiving the laser beam reflected by the recording surface; detection means for calculating a relative positional relationship between the disk and a focal position of the laser beam based on a signal from the pickup; and control means for adjusting the position of the rotary body by controlling the magnetic bearing means.

17 Claims, 8 Drawing Sheets

Fig.9 ial disk recording and reproducing apparatus, and more particularly to a disk recording and reproducing apparatus which implements higher-speed rotation and higher-density data recording.

DISK RECORDING AND REPRODUCING APPARATUS

BACKGROUND OF THE INVENTION

The present invention relates to a disk recording and reproducing apparatus, and more particularly to a disk recording and reproducing apparatus which implements higher-speed rotation and higher-density data recording.

Further, the present invention relates to a disk recording and reproducing apparatus which corrects at least one of a squareness error and a misalignment on a disk recording and reproducing apparatus basis, which further allows such a correction to be made even on a disk-to-disk basis, and which still further allows the squareness to be automatically maintained at zero even in a high-double-speed disk recording and reproducing apparatus that rotates disks at high speeds.

Still further, the present invention relates to a disk recording and reproducing apparatus whose focus adjusting mechanism is downsized.

Figure 1:
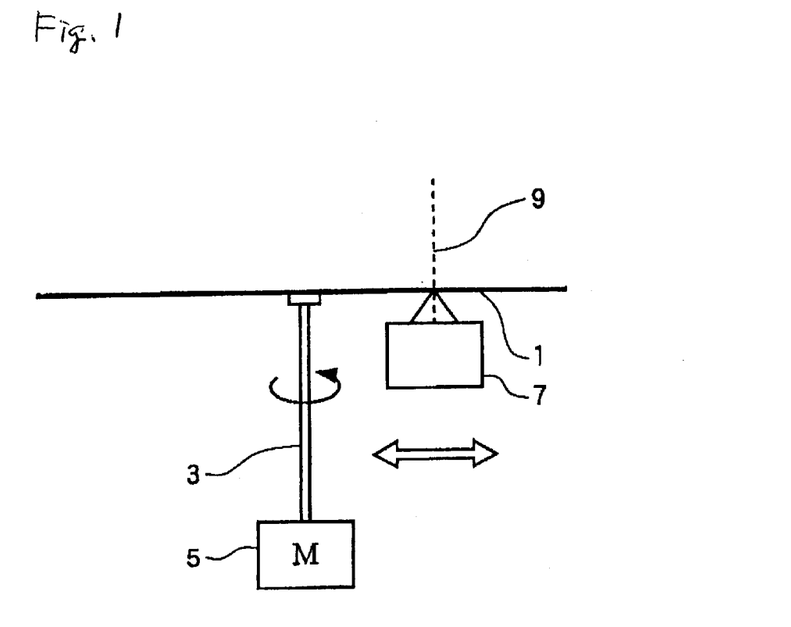
FIG. 1 is a schematic side view for illustrating the principle of a disk recording and reproducing apparatus.
Figure 2:
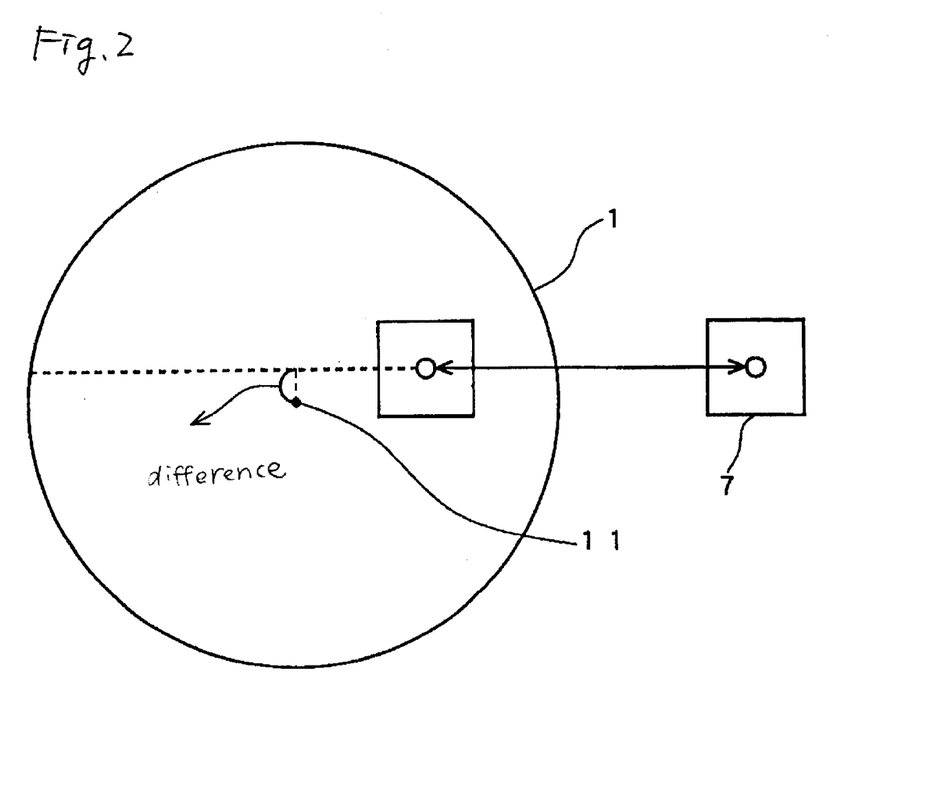
FIG. 2 is a schematic plan view for illustrating the principle of the disk recording and reproducing apparatus.

The principle of a disk recording and reproducing apparatus will be described briefly based on FIGS. 1 and 2. In FIGS. 1 and 2, an optical disk 1, such as a CD (Compact Disk) or a DVD (Digital Versatile Disk), is rotated about the shaft of a rotary body 3 by a spindle motor 5. A pickup 7 is provided in order to irradiate the signal recording surface of the disk 1 with a laser beam and to receive the laser beam reflected by the signal recording surface. "Squareness" means a deviation value (or a nominal value of the squareness every predetermined time) obtained when the angle formed between the optical axis 9 of the laser beam irradiated from the pickup 7 and a predetermined range of the recording surface of the disk 1 is out of 90 degrees.

On the other hand, in order to search for certain pieces of data recorded on the disk 1, the pickup 7 is moved along a guide rail (not shown) in such a manner that the pickup 7 moves in parallel with the disk 1 and the optical axis 9 of the laser beam is directed toward the outer circumference from the inner circumference of the disk 1. During this movement of the pickup 7, it is ideal for the center of curvature 11 of signal tracks formed on the recording surface of the disk 1 to be positioned on an extension of the locus of movement of a point at which the optical axis 9 of the laser beam crosses the recording surface of the disk 1. It occurs, however, that the center of curvature 11 is out of position (hereinafter referred to as "misalignment") due to problems encountered when the apparatus is manufactured and the like.

The term "misalignment" is defined as a distance between the extension of the locus of movement of the point at which the optical axis 9 of the laser beam crosses the recording surface of the disk 1 and the center of curvature 11 of the signal tracks formed on the recording surface of the disk 1. In order to make correct signal recordings and/or signal readings, values of squareness and misalignment are required to be maintained within their tolerances.

Figure 3:
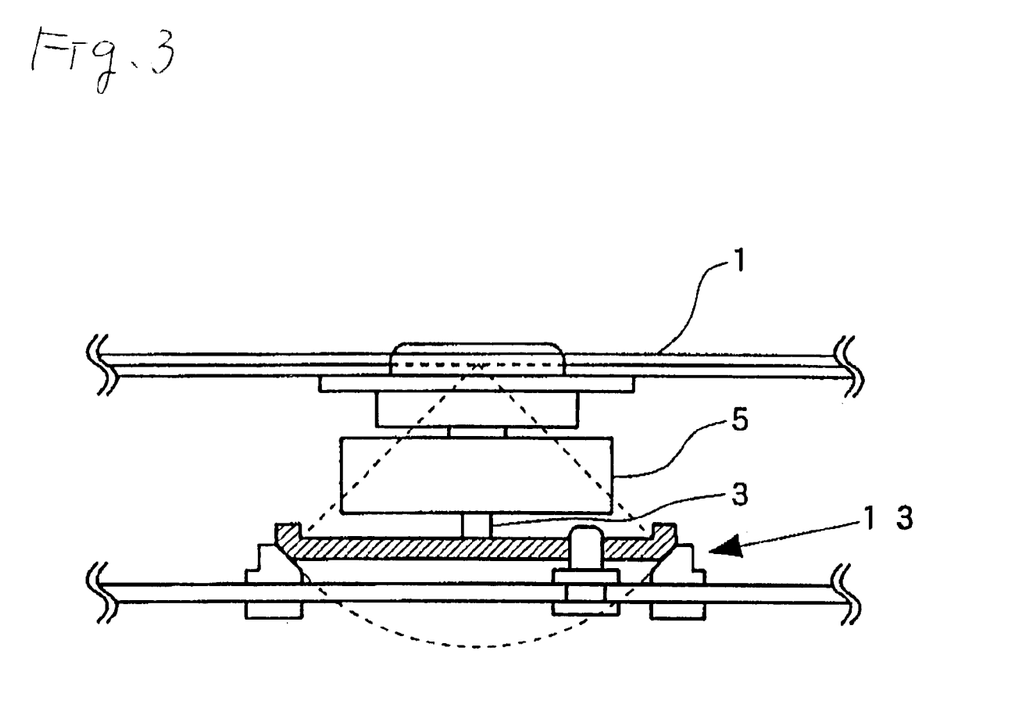
FIG. 3 is a diagram showing a conventional tilt adjusting mechanism.

To meet this requirement, a conventional disk recording and reproducing apparatus is constructed as follows. A tilt adjusting mechanism 13, such as shown in FIG. 3, is provided on a table of the spindle motor 5, and the mechanism 13 is adjusted during the manufacturing process. Alternatively a tilt servo control means for controlling the direction of both the whole pickup 7 and its guide rail and the like is provided. The tilt servo control means maintains the squareness at zero by detecting the squareness while signal recordings and/or signal readings are being made.

Further, a misalignment adjusting mechanism (not shown) for adjusting the direction of the guide rail of the pickup 7 is also provided, and this mechanism is adjusted during the manufacturing process.

However, there has been the disadvantage that the conventional tilt adjusting mechanism 13 and misalignment adjusting mechanism can correct squareness errors and misalignments caused by profile errors and assembling errors of the rotating mechanical parts of the disk 1 and of the driving mechanical parts of the pickup 7 on a disk recording and reproducing apparatus basis, but squareness errors and misalignments caused by the warpage of a disk and eccentricity of the center hole and of the center of curvature of the signal tracks cannot be corrected.

Further, since the conventional tilt servo control means has to change the direction of the whole pickup 7 and the direction of the guide rail of the pickup 7 and the like, it needs to handle a large inertia of its controlling object, and hence the response of its control system is slow. Therefore, in a high-double-speed disk recording and reproducing apparatus that rotates disks at high speeds, there arises the disadvantage that such means does not allow the squareness to be automatically maintained at zero.

Figure 4:
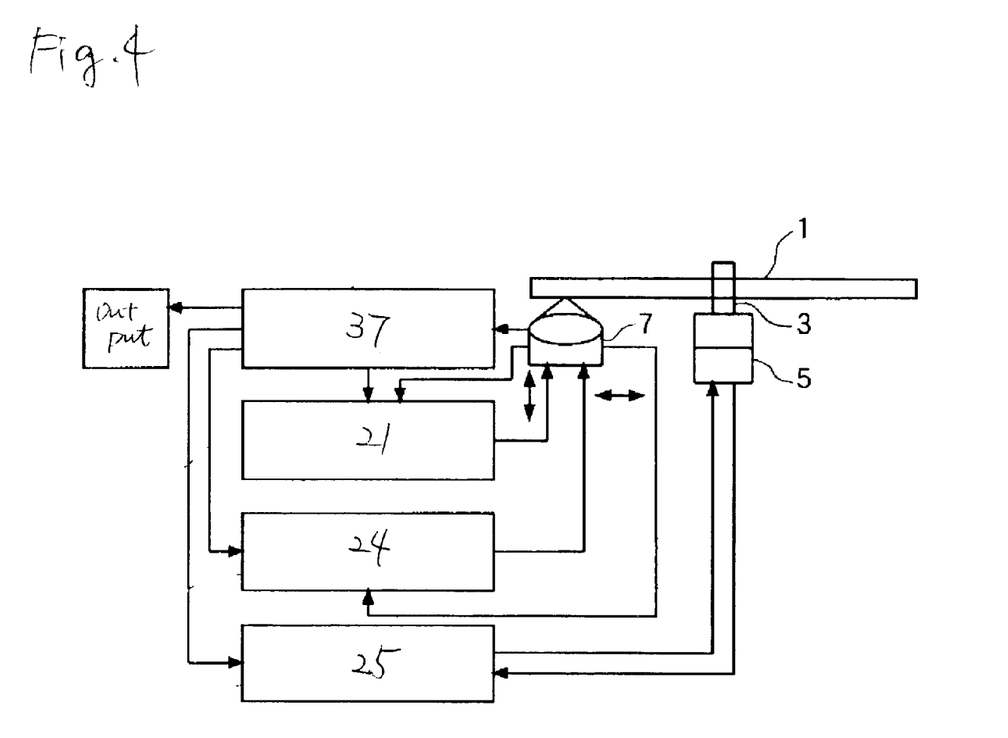
FIG. 4 is a schematic conceptual diagram showing the whole of a conventional disk recording and reproducing apparatus.
Figure 5:
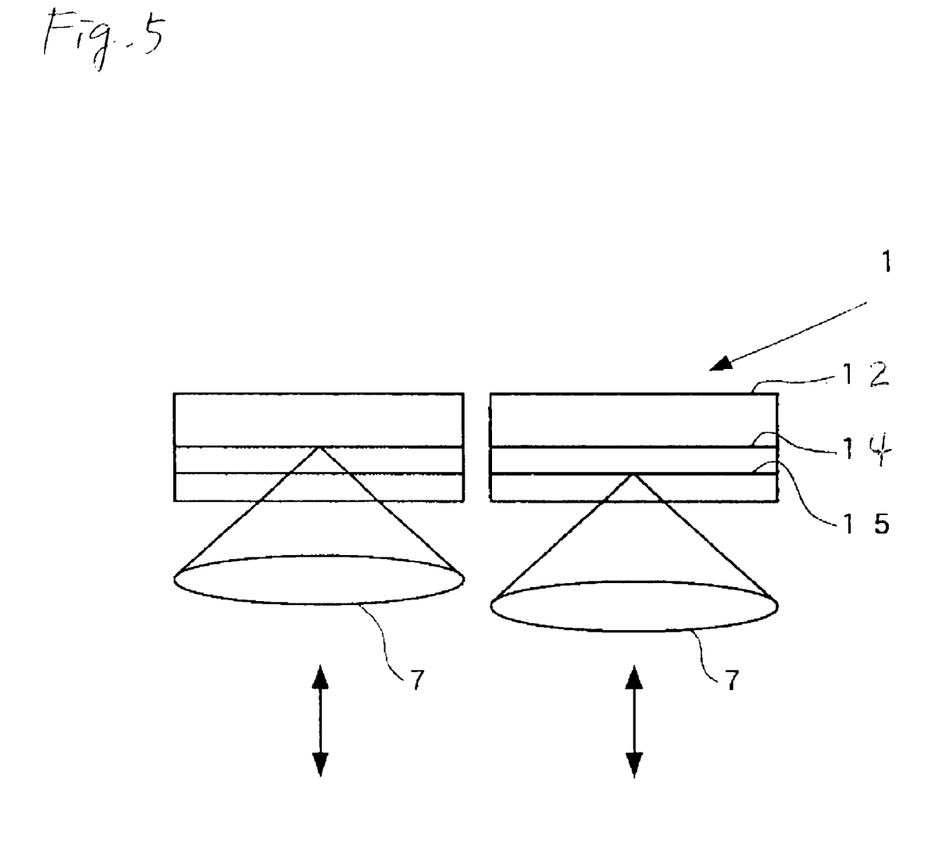
FIG. 5 is a schematic diagram showing the construction of a disk.

On the other hand, FIG. 4 is a schematic conceptual diagram showing the whole conventional disk recording and reproducing apparatus. Further, FIG. 5 is a schematic diagram showing the construction of a disk that allows data to be recorded and reproduced in two layers in one direction. The disk 1 has data recording layers 14 and 15 within its translucent film 12. A disk type determination/switching/reading unit 37 can determine the type of a disk, such as a CD or a DVD, to switch modes and reproduce data recorded on the disk.

The disk 1 is driven to rotate by the motor 5 through the rotary body 3. The rpm of the rotary body 3 is adjusted by a rotary servo 25. The pickup 7 irradiates the data recording layers 14 and 15 with a laser beam, and receives the laser beam reflected by the recording surface of these data recording layers 14 and 15.

Generally, in the conventional disk recording and reproducing apparatus, in order to read data recorded on the disk 1, the focus of the pickup 7 needs to be adjusted as shown in FIG. 5, and thus a focus servo actuator 21 is provided in the pickup 7 to implement such a focus adjustment.

Further, in order to read the data on the disk 1, a tracking servo actuator 24 is also required to be provided. The actuator 24 serves to move the objective lens of the pickup 7 in the radial direction of the disk 1. Thus, the pickup 7 has two types of actuators, the actuators 21 and 24.

Still further, the fact that the pickup 7 incorporates therein two actuators has imposed the problems, e.g., that it is hard to downsize the apparatus and that measures against heat derived from the actuators needs to be taken.

Still further, the conventional disk recording and reproducing apparatus uses bearings, such as ball bearings, which come in mechanical contact with the rotary body 3 for supporting the rotary body 3 arranged at the center of the disk 1, and this has prevented the disk 1 from rotating at a very high speed.

Still further, when bearings such as ball bearings involving mechanical contact are used, the rotary body 3 is subjected to deflections caused by its rotation due to, e.g., the fact that the rotary body 3 is out of balance and that there is a clearance between the rotary body 3 and the bearing.

A solution to these problems could be the use of bearings such as gaseous bearings, so that mechanical contact can be avoided.

However, even when gaseous bearings are used, a problem is still addressed in that the bearing of this type is hard to be controlled actively unlike a bearing utilizing a magnetic force. For this reason, the use of gaseous bearings gives no substantial improvement for the deflection of the rotary body 3 compared with the use of bearings involving mechanical contact such as ball bearings. Thus, even with the use of gaseous bearings, the deflection of the rotary body 3 and the like still impose the problem that the data recording density cannot be improved.

SUMMARY OF THE INVENTION

The present invention has been made in view of these conventional problems. An object of the invention is, therefore, to provide a disk recording and reproducing apparatus which corrects at least one of a squareness error and a misalignment on a disk recording and reproducing apparatus basis, which further allows such a correction to be made even on disk-to-disk basis as well, and which still further allows the squareness to be maintained within a prescribed tolerance, e.g., zero, even in a high-double-speed disk recording and reproducing apparatus that rotates disks at high speeds.

Further, another object of the present invention is to provide a disk recording and reproducing apparatus which downsizes a focus adjusting mechanism and implements high-speed rotation and high-density data recording.

To achieve the above objects, the present invention provides a disk recording and reproducing apparatus comprising: magnetic bearing means capable of supporting a rotary body and adjusting a relative position of the rotary body; a pickup for irradiating, with a laser beam, a recording surface of a disk mounted on a table arranged on the rotary body and receiving the laser beam reflected by the recording surface; detection means for calculating a relative positional relationship between the disk and a focal position of the laser beam based on a signal from the pickup; and control means for adjusting the position of the rotary body by controlling the magnetic bearing means.

Further, the detection means preferably comprises squareness detection means for detecting a squareness formed by an optical axis of the laser beam irradiated from the pickup with respect to a predetermined range of the recording surface of the disk, and the control means adjusts a tilt of the rotary body by controlling the magnetic bearing means in such a manner that the squareness detected by the squareness detection means is maintained within a prescribed tolerance.

Still further, the detection means includes squareness detection means for detecting a squareness formed by an optical axis of the laser beam irradiated from the pickup with respect to a predetermined range of the recording surface of the disk, and misalignment detection means for detecting a distance between an extension of a locus of movement of the optical axis of the laser beam accompanied with a movement of the pickup toward the center of rotation of the disk and the center of curvature of signal tracks on the recording surface of the disk, and the control means adjusts the relative position of the rotary body by controlling the magnetic bearing means in such a manner that both the squareness detected by the squareness detection means and the distance detected by the misalignment detection means are maintained within prescribed tolerances.

Still further, the control means adjusts the position of the rotary body in an axial direction by controlling the magnetic bearing means in such a manner that the recording surface of the disk coincides with the focal position of the laser beam irradiated from the pickup.

Still further, the magnetic bearing means has at least one of an electromagnet and a permanent magnet for magnetically adjusting the position of the rotary body in the axial direction.

Still further, the magnetic bearing means comprises at least electromagnets or permanent magnets arranged at two different places in the axial direction of the rotary body for magnetically adjusting the position of the rotary body in a radial direction, respectively.

Still further, there is provided rotation means for rotating the rotary body between the electromagnets or permanent magnets constituting the magnet bearing means, the electromagnets or permanent magnets being arranged at two different places in the axial direction of the rotary body for magnetically adjusting the position of the rotary body in a radial direction, respectively.

Still further, the magnetic bearing means magnetically adjusts the position of the rotary body at least in the axial direction or in the radial direction while generating a rotating force as a result of a magnetic force generated by an armature winding arranged on the rotation means being made out of balance by a magnetic force generated either by the magnetic bearing means for magnetically adjusting the position of the rotary body in the axial direction or the magnetic bearing means for magnetically adjusting the position of the rotary body in the radial direction.

DETAILED DESCRIPTION OF THE PREFERRED EMBODIMENTS

Embodiments of the present invention will now be described.

Figure 6:
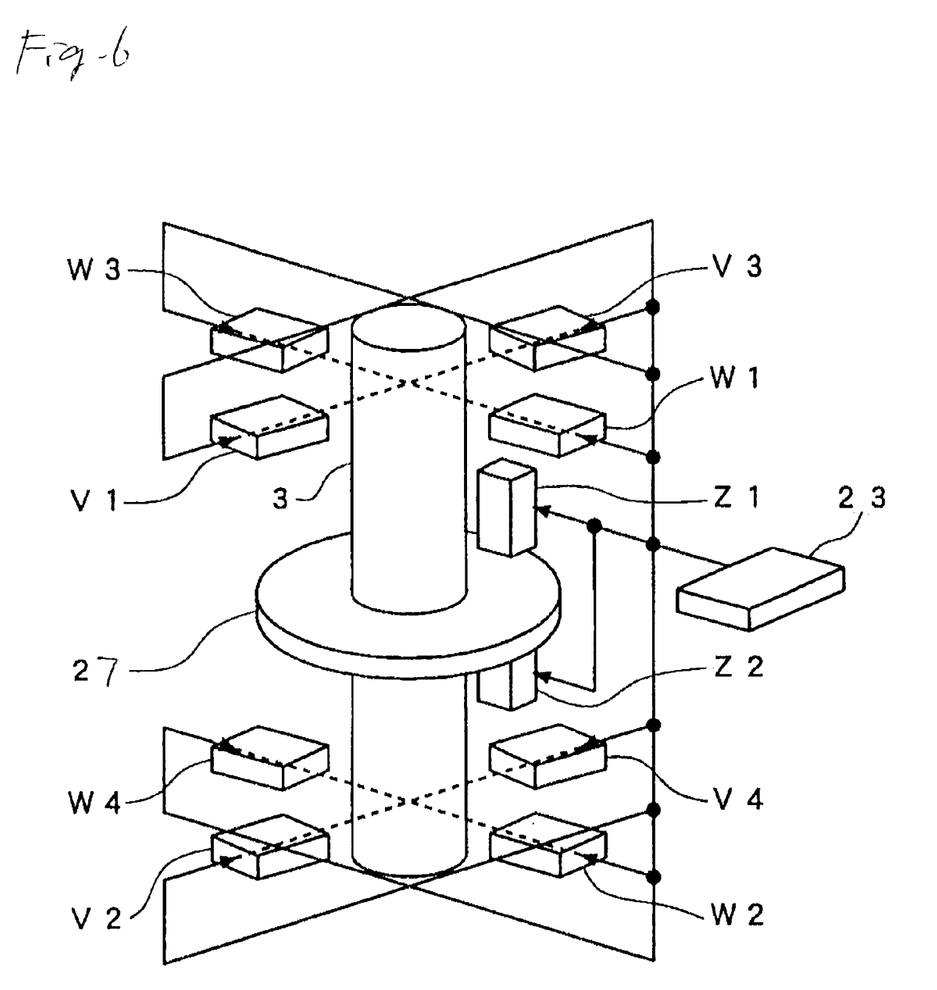
FIG. 6 is a diagram showing the construction of the main portion of an embodiment of the present invention.

FIG. 6 shows an embodiment of the present invention. In FIG. 6, a table (not shown) is fixed on top of a rotary body 3, and a disk 1 is placed on the table. Since this construction is the same as the conventionally embodied construction, it is not shown in the drawing. Further, in this embodiment, a pickup 7 irradiates the recording surface of the disk with a laser beam and then performs other operations similarly to the case shown in FIGS. 1 and 2, and thus those components are not shown in the drawing, either.

In order to adjust the upper-side position of the rotary body 3 in the radial direction, upper-side radial direction position control electromagnets V1, V3, W1 and W3 are arranged symmetrically so as to interpose the rotary body 3. Further, in order to adjust the lower-side position of the rotary body 3 in the radial direction, lower-side radial direction position control electromagnets V2, V4, W2 and W4 are arranged symmetrically so as to interpose the rotary body 3. Still further, a metallic disk 27 is fixed to the rotary body 3. In order to adjust the position of the metallic disk 27 in an axial direction, axial direction position control electromagnets Z1 and Z2 are arranged.

Note that permanent magnets can substitute for the upper-side radial direction position control electromagnets V1, V3, W1 and W3, the lower-side radial direction position control electromagnets V2, V4, W2 and W4, and the axial direction position control electromagnets Z1 and Z2 in whole or in part.

As a squareness detector and a misalignment detector, conventionally embodied detectors can be used, and thus they are not shown in the drawing. Signals from the squareness detector and the misalignment detector are input to a rotary body position controller 23. The rotary body position controller 23 controls the position of the rotary body 3 by adjusting the magnetic forces of the electromagnets V1, V3, W1, W3, V2, V4, W2, W4, Z1 and Z2 in such a manner that each of the squareness and misalignment values is set at zero based on the signals from the squareness detector and the misalignment detector. The rotary body position controller 23 is equivalent to the control means.

While the armature of a motor for driving to rotate the rotary body 3 is not shown in the drawing for purposes of simplicity, it is desirable to interpose the armature between the upper-side radial direction position control electromagnets V1, V3, W1 and W3 and the lower-side radial direction position control electromagnets V2, V4, W2 and W4. However, an end face motor may be mounted on the side of the lower end face of the rotary body 3.

Next, the operation will be described.

The signals are input to the rotary body position controller 23 from the squareness detector and the misalignment detector. In response to these signals, the rotary body position controller 23 controls the position of the rotary body 3 by adjusting the magnetic forces of the electromagnets V1, V3, W1, W3, V2, V4, W2, W4, Z1 and Z2 in such a manner that each of the squareness and misalignment values is set at zero. A series of adjusting operations are constantly repeated while signal recordings and/or signal readings are being made.

By the aforementioned method, squareness errors and misalignments caused by profile errors and assembling errors in the disk rotating mechanical parts and pickup driving mechanical parts are corrected, and at the same time, squareness errors and misalignments caused by the warpage of a disk and the eccentricity of the center hole and of the center of curvature of signal tracks can be corrected on a disk-to-disk basis as well.

As a result, reliability in signal recording and/or signal reading can be improved. Further, compared with the conventional tilt servo control means, the controller 23 controls an object whose mass is smaller and thus its control system has a quicker response. Therefore, even in a high-double-speed disk recording and reproducing apparatus, the squareness can be automatically maintained at zero. Still further, since the rotary body 3 is supported in a noncontact manner, the disk 1 can be rotated at high speeds.

By the way, to adjust the squareness, the tilt of the rotary body 3 is adjusted in such a direction as to make the squareness zero. Specifically, only the upper-side position of the rotary body 3 in the radial direction or only the lower-side position of the rotary body 3 in the radial direction may be adjusted, or both positions may be adjusted.

Further, the misalignment can be adjusted by parallelly moving the rotary body 3 in such a direction as to make the misalignment values zero, i.e., by adjusting both the upper-side and lower-side positions of the rotary body 3 in the radial direction.

By the way, while no mention has been made above, the position of the rotary body 3 in the axial direction is adjusted by the electromagnets Z1 and Z2. This adjustment is made so that the position of the rotary body 3 in the axial direction coincides with a prescribed reference value. Further, this adjustment may be also made by correcting errors in position between the pickup and the recording surface of the disk which are caused when the tilt of the rotary body 3 has been adjusted, i.e., by correcting focal position errors of the pickup or the like.

Note that the present invention can be applied to any type disk recording apparatuses, disk reproducing apparatuses and disk recording and reproducing apparatuses.

Further, while the example in which both squareness errors and misalignments are adjusted has been described in the aforementioned embodiment, it may be so designed to adjust only squareness errors or only misalignments.

Still further, the magnetic bearing means may be constructed so as to adjust only the upper-side or lower-side position of the rotary body 3 in the radial direction. For example, it may also be so designed that the upper-side position of the rotary body 3 in the radial direction is magnetically supported and adjusted by the electromagnets V1, V3, W1 and W3 shown in FIG. 6, and the lower-side position of the rotary body 3 is supported using bearings other than the magnetic bearings, such as pivot bearings.

However, if the magnetic bearing means is used to support the positions of the rotary body 3 in both radial and axial directions, the rotary body 3 can be supported in a noncontact manner, and thus the rotary body 3 can be rotated at the highest speed.

Figure 7:
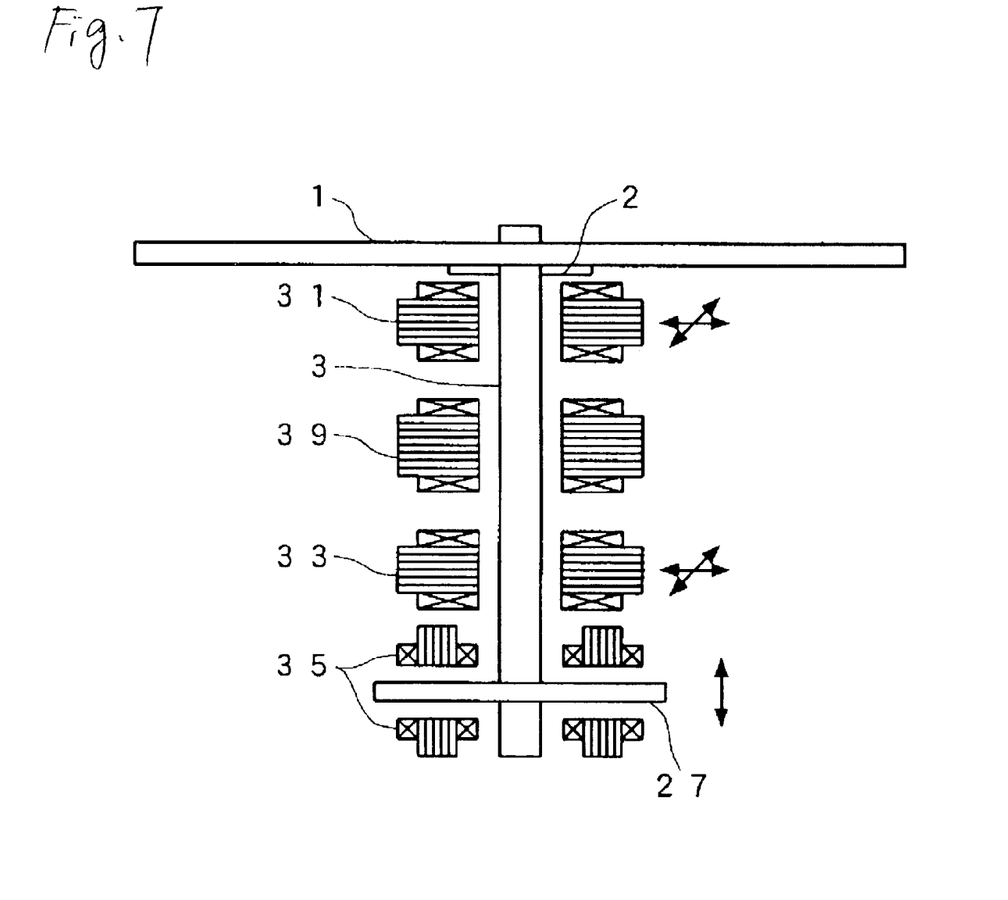
FIG. 7 is a diagram showing the construction of the main portion of an embodiment of the present invention.

Further, FIG. 7 shows the construction of the main portion of an embodiment of the present invention. In FIG. 7, a table 2 is fixed or integrally formed on top of the solid or hollow rotary body 3, and the disk 1 is mounted on the table 2. This construction is the same as the conventionally embodied construction.

Further, since the pickup 7 irradiates a data recording layer 14 or 15 of the disk 1 with a laser beam and performs other operations similarly to the case shown in FIGS. 1 and 2, these components are not shown in the drawing. In order to adjust the upper-side position of the rotary body 3 in the radial direction. Upper-side radial direction position control electromagnets 31 are arranged symmetrically so as to interpose the rotary body 3. The upper-side radial direction position control electromagnets 31 have radial direction position control windings arranged, respectively.

Further, in order to similarly adjust the lower-side position of the rotary body 3 in the radial direction, lower-side radial direction position control electromagnets 33 are arranged symmetrically so as to interpose the rotary body 3. Still further, the metallic disk 27 is fixed to the rotary body 3. In order to adjust the position of the metallic disk 27 in the axial direction, axial direction position control electromagnets 35 are arranged.

A motor 39 is driven to rotate the rotary body 3.

Next, the operation will be described.

Figure 8:
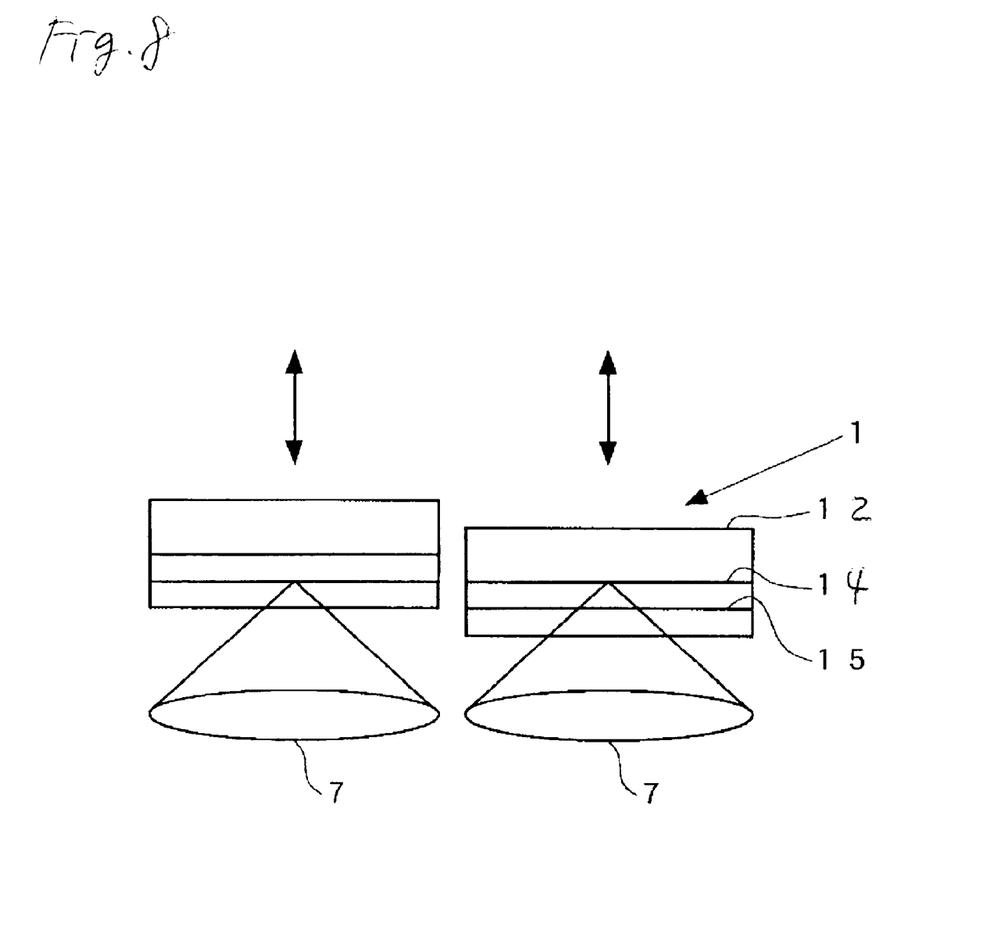
FIG. 8 is a diagram showing the positional relationship between a pickup and data recording layers of a disk.

FIG. 8 shows a positional relationship between the pickup and the data recording layers of the disk. As shown in FIG. 8, the pickup 7 is not allowed to move in the axial direction of the rotary body 3. Instead, the rotary body 3 itself is moved in the axial direction while being caused to magnetically float up, and positions the pickup 7 so that the pickup 7 focuses its laser beam either on the data recording layer 14 or the data recording layer 15 of the disk 1.

In order to detect the laser beam having been focused on a desired layer, a conventionally used method such as a knife edge method or an astigmatism method may be used. Based on the detection result, the axial direction position control electromagnets 35 are feedback-controlled, thereby controlling the position of the rotary body 3 in the axial direction.

Then, let it be considered that the laser beam is focused on the other data recording layer. In this case, the position of the rotary body 3 is moved in the axial direction using the axial direction position control electromagnets 35 while its position in the radial direction is being maintained by the upper-side radial direction position control electromagnets 31 and the lower-side radial direction position control electromagnets 33. Thus, the rotary body 3 is positioned so that the pickup focuses its laser beam on the other data recording layer.

Figure 9:
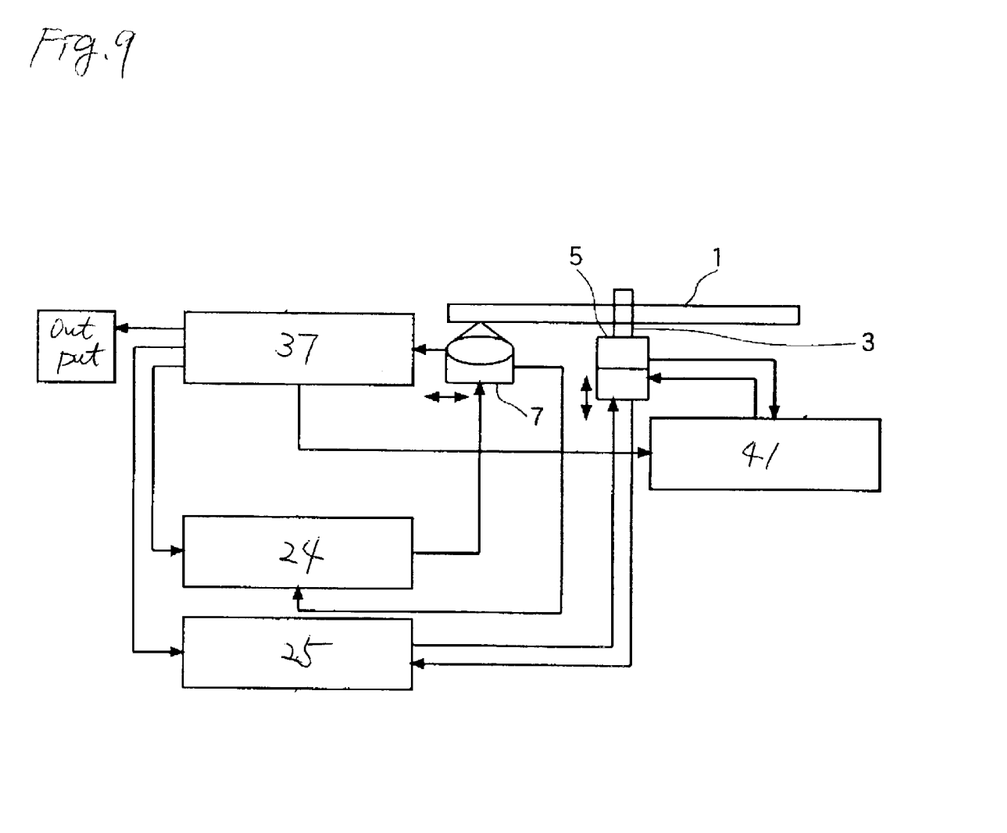
FIG. 9 is a schematic conceptual diagram showing the whole of a disk recording and reproducing apparatus of the present invention.

To make a simple comparison with the conventional example, the whole disk recording and reproducing apparatus of the present invention is schematically shown in a conceptual form in FIG. 9. In FIG. 9, a magnet bearing control circuit/focus servo 41 is provided in place of the conventional focus servo actuator 21. That is, an axial direction position control mechanism in the magnetic bearing control circuit also functions as the focus servo.

As a result of this construction, the conventionally used lens moving actuator for allowing the pickup 7 to focus its laser beam can be dispensed with, and thus the apparatus can be downsized. In addition, the pickup 7 is no longer affected by the heat caused by the actuator being heated.

According to the present invention, the function of the conventional focus servo actuator 21 is implemented in the magnetic bearing section for magnetically supporting the rotary body 3 in the axial direction. Since the conventional disk drive also includes the bearings for supporting the rotary body 3, the magnetic bearing section in the apparatus of the present invention is not likely to increase the size of the apparatus remarkably.

Further, a magnetic bearing control circuit must be additionally provided. However, such a circuit is constructed of an axial direction position control circuit and a radial direction position control circuit. Since the former control circuit is equivalent to the conventional focus servo actuator 21 control circuit, it is only the latter control circuit that is to be added thereto. Therefore, the apparatus is not likely to increase its size so largely as compared with the conventional apparatus.

Note that permanent magnets can substitute for the radial direction position control electromagnets 31 and 33. In this case, only the axial direction position control circuit is required in the magnetic bearing control circuit, and thus the construction of the magnetic bearing control circuit can be made substantially the same as that of the conventional apparatus.

Further, by using the magnet bearings, the rotary body 3 for rotating the disk 1 is supported in a noncontact manner, and thus mechanical contact resistance is eliminated and the disk 1 can be rotated at high speeds. Therefore, an (ultra) high-double-speed disk drive which could hardly be implemented by any conventional technology can be implemented.

Further, since the magnetic bearings are controlled actively, the rotary body deflects less than in the case where conventional bearings are used. As a result, a data recording can be made at a higher density than with the conventional disk.

Further, by using a bearingless motor in which a motor is integrated with magnetic bearings, it is expected that the apparatus can be further function-intensive and downsized. Specifically, for example, an electric motor winding 39 is made independent of radial direction position control windings 31 and 33, and is wound over the windings 31 and 33. With this arrangement, the magnetic force generated by the electric motor winding is made out of balance by the magnetic force generated by the radial direction position control windings, which in turn generates such a rotating force as to magnetically adjust the position of the rotary body in the radial direction.

Further, the following arrangement may be also made. The electric motor winding is made independent of axial position control windings, and is wound over the axial direction position control windings. In addition, permanent magnets or windings are provided on the metallic disk. With this arrangement, the magnetic force generated by the electric motor winding is made out of balance by the magnetic force generated by the axial direction position control windings, which in turn generates with respect to the metallic disk such a rotating force as to magnetically adjust the position of the rotary body in the axial direction.

While the motor 39 is interposed between the radial direction position control electromagnets 31 and 33 in the above embodiment, the invention is not limited to this embodiment; an end face motor mounted on the side of the lower end face of the rotary body 3 as viewed in FIG. 7 may also be used.

Further, permanent magnets can substitute for one, two or all the groups of the electromagnets 31, 33 and 35, or permanent magnets can substitute for only one part of the respective electromagnets. When permanent magnets substitute for all the electromagnets in the respective electromagnets, the axial direction position of the rotary body 3 can be controlled by controlling the movement of the permanent magnets.

Still further, the number of recording layers of the disk is not limited to two as in the aforementioned embodiment. The invention can be applied to a disk having a single recording layer, or a multi-layer disk having three or more recording layers.

The present invention can be applied to any type of recording apparatuses, reproducing apparatuses, and recording and reproducing apparatuses for optical disks such as CDs and DVDs.

As described in the foregoing, according to the present invention, the position of the rotary body at least at one point in the radial direction is magnetically adjusted so that squareness errors and/or misalignment values are automatically maintained at zero or within their tolerances. Therefore, squareness errors and/or misalignments are corrected on a disk recording and re-producing apparatus basis, and at the same time, can be corrected on a disk basis as well.

Further, since the control system for making this adjustment has a quick response, this adjustment can be also made on a high-speed disk recording and reproducing apparatus.

Still further, by magnetically supporting and adjusting the position of the rotary body in both radial and axial directions using the magnetic bearings, the rotary body can be supported in a noncontact manner, and thus the disk can be driven to rotate at high speeds.

Still further, the magnetic bearings having a focus adjustment function is used to support the disk, and thus the apparatus can be downsized. In addition, the apparatus can implement high-speed rotation and high-density data recording.

What is claimed is:

1. A disk recording and reproducing apparatus comprising: a motor; a rotary body driven by the motor to undergo rotation; a table supported by the rotary body to undergo rotation therewith; magnetic bearing means for supporting the rotary body and adjusting a relative position of the rotary body; a pickup for irradiating with a laser beam a recording surface of a disk mounted on the table arranged on the rotary body and receiving the laser beam reflected by the recording surface; detection means for calculating a relative positional relationship between the disk and a focal position of the laser beam based on a signal output by the pickup; and control means for adjusting the position of the rotary body by controlling the magnetic bearing means in accordance with an output of the detection means.

2. A disk recording and reproducing apparatus according to claim 1; wherein the detection means comprises squareness detection means for detecting a squareness formed by an optical axis of the laser beam irradiated by the pickup with respect to a predetermined range of the recording surface of the disk, and the control means adjusts a tilt of the rotary body by controlling the magnetic bearing means so that the squareness detected by the squareness detection means is maintained within a prescribed tolerance.

3. A disk recording and reproducing apparatus according to claim 1; wherein the detection means includes squareness detection means for detecting a squareness formed by an optical axis of the laser beam irradiated by the pickup with respect to a predetermined range of the recording surface of the disk, and misalignment detection means for detecting a distance between an extension of a locus of movement of the optical axis of the laser beam accompanied with a movement of the pickup toward a center of a curvature of signal tracks on the recording surface of the disk, and the control means adjusts the relative position of the rotary body by controlling the magnetic bearing means so that both the squareness detected by the squareness detection means the the distance detected by the misalignment detection means are maintained within prescribed tolerances.

4. A disk recording and reproducing apparatus according to claim 1; wherein the control means adjusts the position of the rotary body in an axial direction thereof by controlling the magnetic bearing means in such a manner that the recording surface of the disk coincides with the focal position of the laser beam irradiated by the pickup.

5. A disk recording and reproducing apparatus according to claim 1; wherein the magnetic bearing means has at least one of an electromagnet and a permanent magnet for magneticlaly adjusting the position of the rotary body in the axial direction thereof.

6. A disk recording and reproducing apparatus according to claim 1; wherein the magnetic bearing means comprises at least one of electromagnets and permanent magnets arranged at two different positions along an axial direction of the rotary body for magnetically adjusting the position of the rotary body in at least one of an axial direction and a radial direction thereof.

7. A disk recording and reproducing apparatus according to claim 6; further comprising rotation means for rotating the rotary body between the electromagnets or permanent magnets constituting the magnetic bearing means, the electromagnets or permanent magnets being arranged at two different places in the axial direction of the rotary body for magnetically adjusting the position of the rotary body in at least one of an axial direction and a radial direction thereof.

8. A disk recording and reproducing apparatus according to claim 7; wherein the magnetic bearing means magnetically adjusts the position of the rotary body at least in at least one of the axial direction and the radial direction thereof by generating a rotating force as a result of a magnetic force generated by an armature winding of the rotation means being out of balance.

9. A disk playing apparatus comprising: a motor; a rotary member driven by the motor to undergo rotation; a disk support member fixed to the rotary member to undergo rotation therewith; a magnetic bearing for supporting the rotary member and adjusting a relative position thereof in at least one of an axial and a radial direction thereof; a reading device for reading data from a disk mounted on the disk support member; and a circuit for supplying a control signal to the magnetic bearing to maintain the rotary member at a desired orientation with respect to the reading device.

10. A disk playing apparatus according to claim 9; wherein the circuit comprises detection means for calculating a relative positional relationship between the disk and a focal position of the beam based on a signal output by the reading device, and control means for adjusting the position of the rotary body by controlling the magnetic bearing in accordance with an output of the detection means.

11. A disk playing apparatus according to claim 9; wherein the reading device comprises a pickup for irradiating a surface of a disk mounted on the table with a laser beam and receiving a beam reflected by the surface.

12. A disk playing apparatus according to claim 11; wherein the circuit comprises squareness detection means for detecting squareness of an optical axis of the laser beam irradiated by the reading device with respect to a predetermined range of the recording surface of the disk, and control means for adjusting a tilt of the rotary member by controlling the magnetic bearing so that the squareness detected by the squareness detection means is maintained within a prescribed range.

13. A disk playing apparatus according to claim 11; wherein the circuit comprises squareness detection means for detecting squareness formed by an optical axis of the laser beam irradiated by the reading device with respect to a predetermined range of the recording surface of the disk, misalignment detection means for detecting a distance between an extension of a locus of movement of the optical axis of the laser beam accompanied with a movement of the reading device toward a center or curvature of signal tracks on a surface of the disk, and control means for adjusting the relative position of the rotary member by controlling the magnetic bearing so that both the squareness detected by the squareness detection means and the distance detected by the misalignment detection means are maintained within prescribed ranges.

14. A disk playing apparatus according to claim 11; wherein the circuit includes control means for adjusting the position of the rotary member in an axial direction by controlling the magnetic bearing so that the recording surface of the disk coincides with the focal position of the laser beam irradiated by the pickup.

15. A disk playing apparatus according to claim 11; wherein the magnetic bearing comprises at least one of an electromagnet and a permanent magnet for magnetically adjusting the position of the rotary member in an axial direction thereof.

16. A disk playing apparatus according to claim 11; wherein the magnetic bearing comprises at least one of plural electromagnets and permanent magnets arranged at different positions is an axial direction of the rotary member for magnetically adjusting an angle of tilt of the rotary member with respect to the reading device.

17. A disk playing apparatus according to claim 16; further comprising rotation means for rotating the rotary body between the electromagnets or permanent magnets of the magnetic bearing.

* * * * *